US012591628B2

(12) United States Patent (10) Patent No.: US 12,591,628 B2
Suzuki (45) Date of Patent: Mar. 31, 2026

(54) ASSISTANT SYSTEM, ASSISTANT METHOD, AND NON-TRANSITORY COMPUTER READABLE RECORDING MEDIUM

(71) Applicant: WOVEN BY TOYOTA, INC., Tokyo (JP)

(72) Inventor: Takahiro Suzuki, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 0 days.

(21) Appl. No.: 18/603,676

(22) Filed: Mar. 13, 2024

(65) Prior Publication Data

US 2024/0330379 A1 Oct. 3, 2024

(30) Foreign Application Priority Data

Mar. 27, 2023 (JP) ................................. 2023-050420

(51) Int. Cl.
*G06F 16/9535* (2019.01)
(52) U.S. Cl.
CPC ................................ *G06F 16/9535* (2019.01)
(58) Field of Classification Search
CPC .................................................. G06F 16/9535
See application file for complete search history.

(56) References Cited

U.S. PATENT DOCUMENTS 10,579,752 B2 * 3/2020 Tadeski .............. G06Q 30/0201
2011/0302240 A1 12/2011 Saito et al.

2013/0346215 A1 * 12/2013 Tajima ............... G06Q 30/0269
705/14.66
2017/0357660 A1 * 12/2017 Damgaard Husted ......................
G06Q 30/0277
2020/0234187 A1 7/2020 Torii et al.
2020/0279006 A1 9/2020 Miyazaki et al.
2020/0380060 A1 * 12/2020 Siani Cohen ............ G06N 3/08
2021/0009136 A1 * 1/2021 DiMeo ................... G07C 5/008
2022/0329556 A1 * 10/2022 Daga ....................... H04L 51/23

FOREIGN PATENT DOCUMENTS

JP 2007-202181 A 8/2007
JP 2010-237916 A 10/2010
JP 2011-253462 A 12/2011
JP 2015-201719 A 11/2015
JP 2019-095832 A 6/2019
JP 2019-215679 A 12/2019
KR 10-2022-0143427 A 10/2022
WO 2019073668 A1 4/2019

* cited by examiner

*Primary Examiner* — Van H Oberly
(74) *Attorney, Agent, or Firm* — Sughrue Mion, PLLC

(57) ABSTRACT

An assistant system for providing a service in response to a request from a user is provided. The assistant system executes first process and a second process. The first process includes selecting content data to be notified to the user from a plurality of pieces of content data, acquiring an evaluation of the user for the notified content data, and updating a preference model of the user based on the acquired evaluation and preference information linked with the notified content data. The second process includes extracting, based on the preference model, one or more pieces of content data having a high degree of matching with preference of the user, and providing the service using the extracted one or more pieces of content data. from the plurality of pieces of content data.

9 Claims, 14 Drawing Sheets

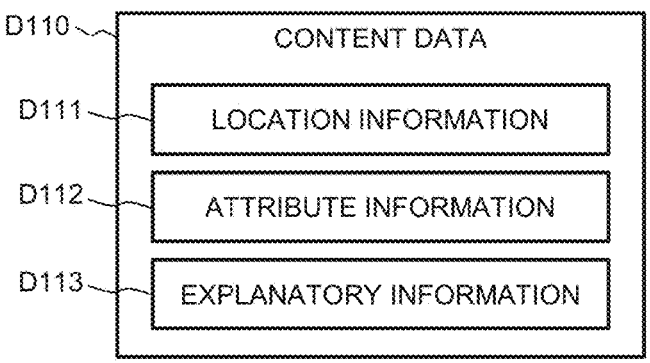
FIG. 2A
| | Name | Category | Area | Cost | Required Time |
|---|---|---|---|---|---|
| Content Data #1 | *** Park | park | Fuji | ¥1,000 | 1h |
| Content Data #2 | ** Restaurant | resaturant | Karuizawa | ¥3,000 | 2h |
| Content Data #3 | **** Hot Spring | hot spring | Kusatsu | ¥5,000 | 2h |
| | | | | | |
D112
FIG. 2B
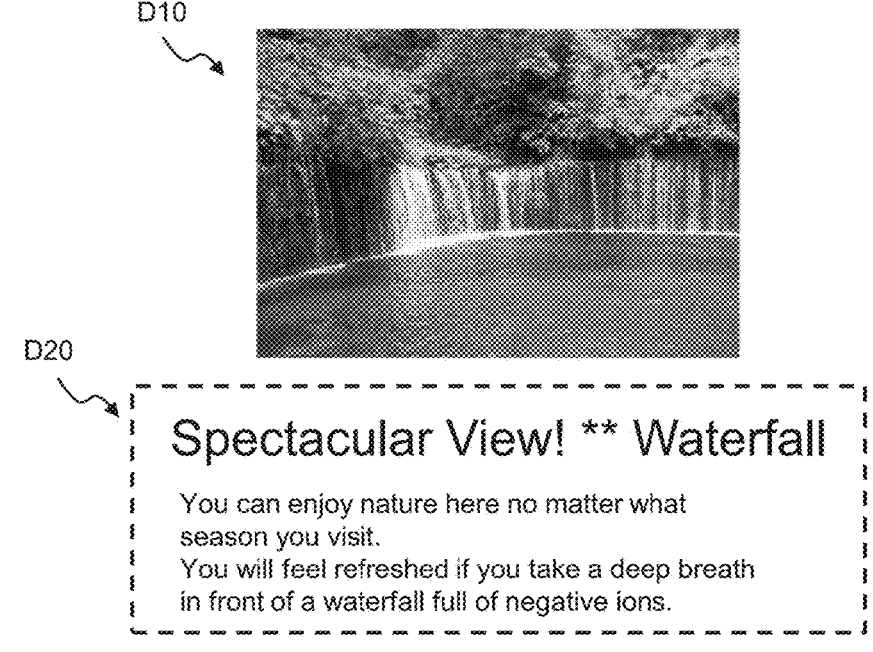
D113
FIG. 2C

D120

| | warming | refresh | wild | exciting | reasonable | natural | artificial | photogenic |
|---|---|---|---|---|---|---|---|---|
| Content Data #1 | | ✓ | | | ✓ | ✓ | | |
| Content Data #2 | | | | | | ✓ | | ✓ |
| Content Data #3 | | | | ✓ | | | ✓ | ✓ |
| Content Data #4 | ✓ | ✓ | | | | | | |
| Content Data #5 | | | ✓ | | | | ✓ | |

ASSISTANT SYSTEM, ASSISTANT METHOD, AND NON-TRANSITORY COMPUTER READABLE RECORDING MEDIUM

CROSS-REFERENCE TO RELATED APPLICATION

The present disclosure claims priority to Japanese Patent Application No. 2023-050420, filed on Mar. 27, 2023, the contents of which application are incorporated herein by reference in their entirety.

TECHNICAL FIELD

The present disclosure relates to a technique for providing a service in response to a request from a user.

BACKGROUND ART

In recent years, techniques have been considered to analyze preference of a user and provide functions corresponding to the preference of the user.

For example, Patent Literature 1 discloses a content recommendation system comprising: a first storage section for accumulating and storing preference discrimination information in which information related to evaluation of content and identification information of a user are associated with each other; a second storage section for storing content feature information in which data indicating features of content are associated with identification information of content; a first processing section for creating preference information of each user based on the preference discrimination information and the content feature information; and a second processing section for transmitting a list of recommended content extracted by evaluating the degree of similarity of features with the preference information based on the content feature information.

In addition, the following Patent Literatures 2 to 4 are documents showing the technical level of the present technical field.

LIST OF RELATED ART

Patent Literature 1: JP 2011/253462 A
Patent Literature 2: JP 2010/237916 A
Patent Literature 3: JP 2015/201719 A
Patent Literature 4: JP 2019/215679 A

SUMMARY

The inventor of the present disclosure has considered an assistant function that provides a service using content. In such an assistant function, in order to improve user satisfaction, it is required to more accurately analyze preference of the user for the service.

Patent Literature 1 discloses acquiring an evaluation of content selected by an input operation of a user. However, the content selected in this way is affected by the tendency of the user's input operation. Therefore, by continuously acquiring the evaluation of biasedly selected content, it may not be possible to analyze preference of the user for a wide range of content. Furthermore, according to the technique disclosed in Patent Literature 1, preference of the user for features of content is managed. However, when considering the provision of a service using content, the features of content may not be related to the preference of the user for the provided service.

An object of the present disclosure is to provide a technique capable of more accurately analyzing preference of a user with respect to an assistant function that provides a service using content in response to a request from the user.

A first aspect of the present disclosure relates to an assistant system for providing a service in response to a request from a user.

The assistant system comprises:

one or more memories storing a plurality of pieces of content data and a preference model representing preference of the user regarding the service, each of the plurality of pieces of content data linked with preference information regarding the service; and one or more processors.

The one or more processors execute a first process and a second process.

The first process includes:

selecting notification content data from the plurality of pieces of content data, the notification content data being content data to be notified to the user;

acquiring an evaluation of the user for the notification content data; and updating the preference model based on the evaluation for the notification content data and the preference information linked with the notification content data.

The second process includes:

extracting, based on the preference model of the user, one or more pieces of match content data having a high degree of matching with the preference of the user from the plurality of pieces of content data; and providing the service using the one or more pieces of match content data.

A second aspect of the present disclosure relates to an assistant method for providing a service in response to a request from a user by processes executed by a computer. The computer includes one or more memories storing a plurality of pieces of content data and a preference model representing preference of the user regarding the service, each of the plurality of pieces of content data linked with preference information regarding the service.

The assistant method includes executing a first process and a second process by the computer.

The first process includes:

selecting notification content data from the plurality of pieces of content data, the notification content data being content data to be notified to the user;

acquiring an evaluation of the user for the notification content data; and updating the preference model based on the evaluation for the notification content data and the preference information linked with the notification content data.

The second process includes:

extracting, based on the preference model of the user, one or more pieces of match content data having a high degree of matching with the preference of the user from the plurality of pieces of content data; and providing the service using the one or more pieces of match content data.

A third aspect of the present disclosure relates to an assistant program for causing a computer to execute processes for providing a service in response to a request from a user. The computer includes one or more memories storing a plurality of pieces of content data and a preference model representing preference of the user regarding the service, each of the plurality of pieces of content data linked with preference information regarding the service.

The assistant program is configured to cause the computer to execute a first process and a second process.

The first process includes:

selecting notification content data from the plurality of pieces of content data, the notification content data being content data to be notified to the user;

acquiring an evaluation of the user for the notification content data; and updating the preference model based on the evaluation for the notification content data and the preference information linked with the notification content data.

The second process includes:

extracting, based on the preference model of the user, one or more pieces of match content data having a high degree of matching with the preference of the user from the plurality of pieces of content data; and providing the service using the one or more pieces of match content data.

According to the present disclosure, content data to be notified to the user is selected from the plurality pieces of content data without user's operation. Then, the preference model is learned based on an evaluation of the user for the notified content data and the preference information linked with the notified content data. The notification content data is content data selected from a plurality of pieces of content data. It is thus possible to acquire the evaluation of the user for various content data without being affected by the user's operation tendency. As a result, it is possible to accurately analyze preference of the user.

Furthermore, the preference information linked with each of the plurality of pieces of content data represents preference regarding the provided service. It is thus possible to learn preference of the user for the provided service by acquiring the evaluation of the user for the notified content data.

BRIEF DESCRIPTION OF DRAWINGS

FIG. 2A is a diagram showing an example of content data;

FIG. 2B is a diagram showing an example of attribute information of content data;

FIG. 2C is a diagram showing an example of explanatory information of content data;

DETAILED DESCRIPTION

Embodiments of the present disclosure will be described with reference to the accompanying drawings.

1. Assistant System

The assistant system according to the present embodiment provides a service (hereinafter, simply referred to as a scheduling service) for proposing a schedule including one or more destinations to a user in response to a request from the user.

Figure 1:
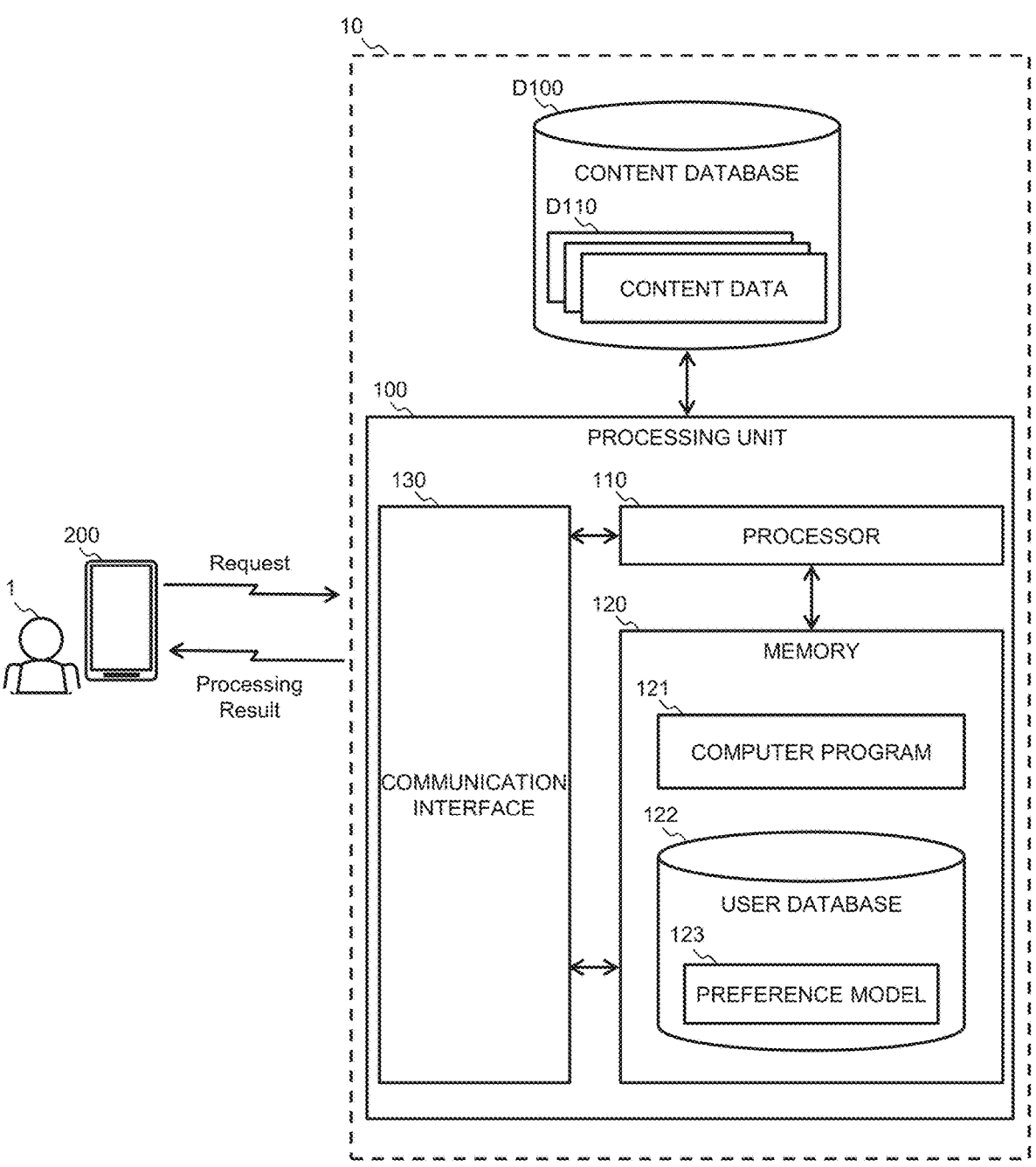
FIG. 1 is a diagram showing an example of a configuration of an assistant system according to the present embodiment.

FIG. 1 is a diagram showing an example of the configuration of an assistant system 10 according to the present embodiment. The functions of the assistant system 10 are realized by processes executed by a processing unit 100. The assistant system 10 is configured to be usable by a user device 200 operated by a user 1.

For example, the processing unit 100 is realized by a server connected to the Internet. And the user device 200 uses the assistant system 10 by communicating with the server via the Internet. Alternatively, the processing unit 100 may be realized as a part of the user device 200. The user device 200 is a device having an HMI function for the user 1, such as a smartphone, a tablet computer, or a personal computer, or the like. Typically, the user device 200 is configured to be able to use the assistant system 10 on a predetermined application. The user device 200 may be a dedicated terminal for using the assistant system 10.

The user 1 operates the user device 200 to transmit a request to the assistant system 10. The processing unit 100 receives the request from the user device 200 and executes processes corresponding to the request. Then, the processing unit 100 transmits a processing result to the user device 200. And the user device 200 notifies the processing result to the user 1. For example, the user device 200 includes a display and displays the processing result on the display. In this way, the user 1 uses the functions of the assistant system 10.

The assistant system 10 includes a content database D100 stored in a predetermined memory. The processing unit 100 is configured to be able to access the content database D100. For example, the content database D100 is stored in a memory of a database server, and the processing unit 100 accesses the database server via the Internet.

The content database D100 manages a plurality of pieces of content data D110. In the present embodiment, each of the plurality of pieces of content data D110 is data regarding a spot to be a candidate for one or more destinations included in a schedule proposed by the assistant system 10. Each spot may be of various types, such as a tourist spot, a scenic spot, a restaurant, a shop, etc.

FIG. 2A is a diagram showing an example of the content data D110. The content data D110 includes location information D111, attribute information D112, and explanatory information D113.

The location information D111 is information showing the map location of the spot corresponding to the content data D110. For example, the location information D111 specifies the map location of the spot by means of latitudes and longitudes. The attribute information D112 is information showing the attribute of the spot corresponding to the content data D110. FIG. 2B is a diagram showing an example of the attribute information D110. In FIG. 2B, the values of "Name", "Category", "Area", "Cost", and "Required Time" of each content data D110 are shown as the attribute information D112. The type of attribute managed by the attribute information D112 may be suitably determined according to the environment to which the present embodiment is applied. The explanatory information D113 is information explaining the spot corresponding to the content data D110. FIG. 2C is a diagram showing an example of the explanatory information D113. In FIG. 2C, image data D10 reflecting the spot and article data D20 for the spot are shown as the explanatory information D113. The image data D10 and the article data D20 may be managed in a suitable format.

In the present embodiment, the content database D100 is further configured to manage the plurality of pieces of content data D110 each of which is linked with preference information regarding the scheduling service. The preference information may be, for example, configured by a plurality of labels representing preference regarding the scheduling service.

Figures 3A, 3B:
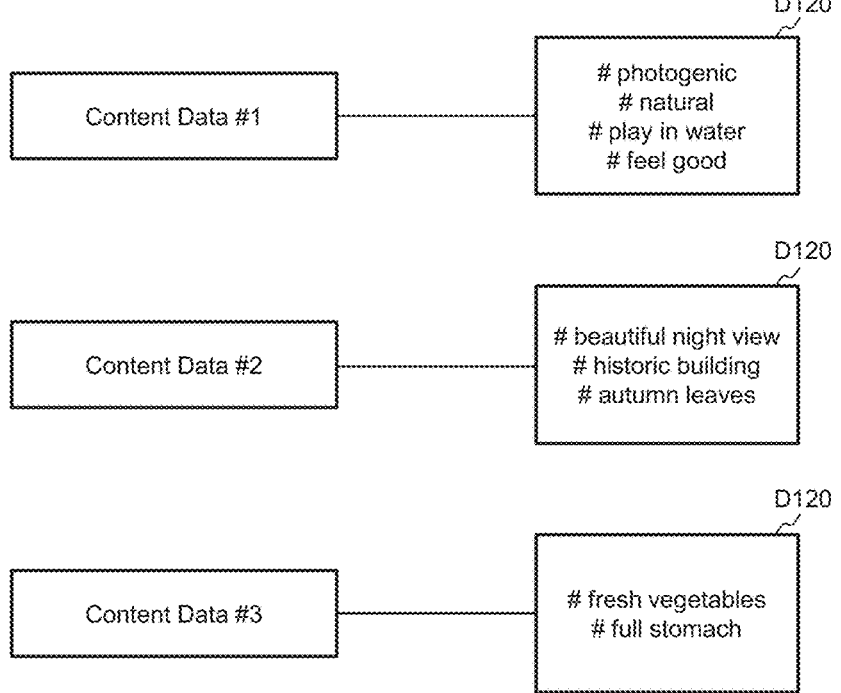
FIG. 3A is a diagram showing an example of preference information linked with content data.
FIG. 3B is a diagram showing an example of preference information linked with content data.

FIG. 3A and FIG. 3B are diagrams showing an example of the preference information D120 linked with each of the plurality pieces of content data D110. FIG. 3A shows an example of managing the preference information D120 for the plurality of pieces of content data D110 in a table. In this example, each predetermined label can be linked with each of the plurality of pieces of content data D110 as shown. FIG. 3B is an example of managing the preference information D120 for each content data D120. In this example, various labels can be linked with each content data D110. In this case, some labels linked with each content data D110 may be unique.

Refer to FIG. 1 again. The processing unit 100 according to the present embodiment includes one or more processors 110 (hereinafter, simply referred to as a processor 110 or processing circuitry), one or more memories 120 (hereinafter, simply referred to as a memory 120), and a communication interface 130.

The processor 110 executes various processes. The processor 110 may be configured by, for example, a central processing unit (CPU) including an arithmetic device, a register, and the like. The memory 120 is connected to the processor 110 and stores various information necessary for the processor 110 to execute processes. The memory 120 may be configured by a recording medium such as a read only memory (ROM), a random access memory (RAM), a hard disk drive (HDD), a solid state drive (SSD), and the like. The communication interface 130 is connected to the processor 110 and the memory 120. The communication interface 130 is provided to transmit and receive information by communicating with external devices of the processing unit 100. The communication interface 130 is, for example, a device that connects to the Internet and communicates. The processing unit 100 communicates with the user device 200 and accesses the content database D100 via the communication interface 130.

The memory 120 stores a computer program 121 and a user database 122.

The computer program 121 may be stored in a computer-readable recording medium. The computer program 121 may be configured by executable instructions for causing the processor 110 to execute processes. The processor 110 operates in accordance with the instructions, and thus the processor 110 executes various processes.

The user database 122 manages information of each user 1 who uses the assistant system 10. For example, the user database 122 is configured to manage information of each user 1 in association with identification information given to each user 1. In this case, the processor 110 can acquire the information of target user 1 by referring to the user database 122 using the identification information of the target user 1.

In the present embodiment, the information of each user managed by the user database 122 includes at least a preference model 123 representing preference of the user 1 regarding the scheduling service. The preference model 123 is configured to be characterized by the preference information D110 linked with the plurality of pieces of content data D120.

For example, as shown in FIG. 3A and FIG. 3B, consider a case where the preference information D120 is configured by a plurality of labels representing preference. In this case, the preference model 123 may be configured to represent the degree of preference for each label. Here, the degree of preference for each label is, for example, a numerical value in the range of $-100$ to $+100$, with the degree of "dislike" being a negative value and the degree of "like" being a positive value. Alternatively, when each label is further represented by a feature vector in a predetermined space, the preference model may be configured to represent a distribution of the degree of preference in which the degree of preference is associated with each position in the predetermined space.

2. Process

In the assistant system 10 according to the present embodiment, functions available to the user 1 are realized by processes executed by the processing unit 100. Hereinafter, the processes executed by the processing unit 100 will be described for each function realized by the assistant system 10.

1-1. First Process

One of the processes executed by the processing unit 100 is a process (hereinafter, referred to as a first process) for realizing a function of learning preference of the user 1 regarding the scheduling service provided by the assistant system 10. In the first process, the processing unit 100 learns the preference of the user 1 by updating the preference model 123 of the user 1.

Figure 4:
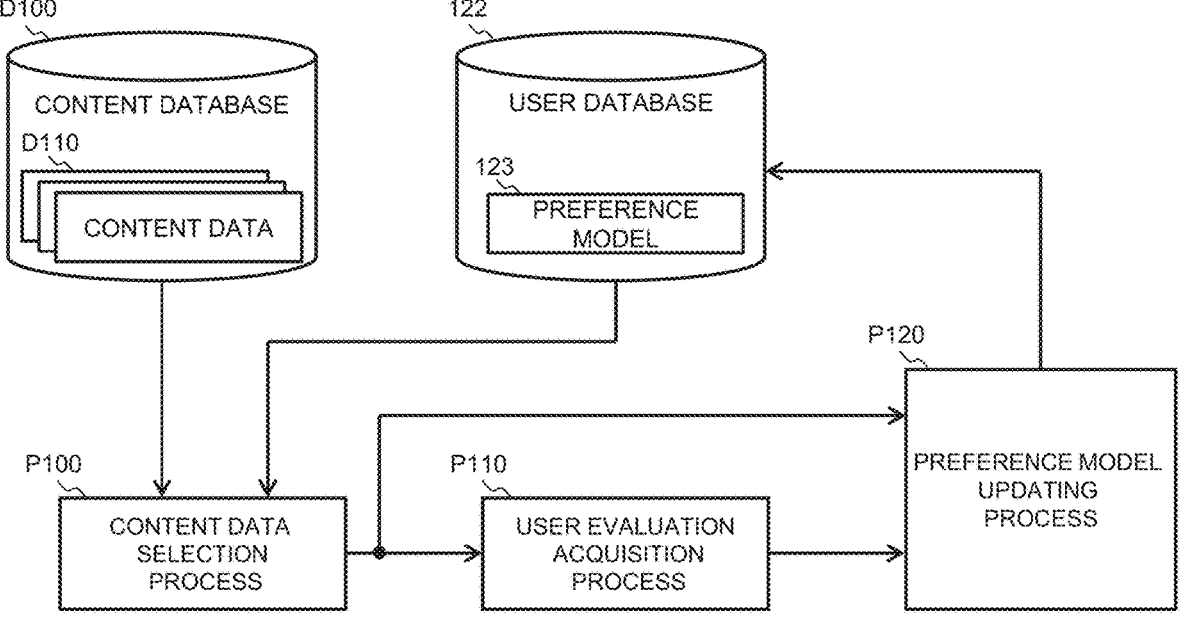
FIG. 4 is a diagram showing an example of a configuration of a first process.

FIG. 4 is a diagram showing an example of a configuration of the first process. The first process includes a content data selection process P100, a user evaluation acquisition process P110, and a preference model updating process P120. These are realized by the processor 110 operating in accordance with the instructions of the computer program 121, for example.

The content data selection process P100 accesses the content database D100 and selects content data to be notified to the user 1 from the plurality of pieces of content data D110. The selected content data (hereinafter referred to as the notification content data) are transmitted to the user evaluation acquisition process D120 and the preference model updating process P110 together with the linked preference information P120.

The user evaluation acquisition process P110 notifies the notification content data to the user 1. And the user evaluation acquisition process P110 acquires an evaluation of the user 1 for the notification content data. For example, the user evaluation acquisition process P110 transmits the notification content data to the user device 200, and causes the user device 200 to display information of the notification content data. The displayed information in this case is, for example, information integrating the location information D111, the attribute information D112, and the explanatory information D113 of the notification content data.

The evaluation of the notification content data by the user 1 is, for example, positive or negative with respect to the notification content data. The evaluation of the user 1 may include other patterns. For example, the evaluation of the user 1 may include "neither", "save to favorite", "check later", and the like.

The user 1 operates the user device 200 to input the evaluation for the notification content data. The user evaluation acquisition process P110 communicates with the user device 200 to receive the input evaluation of the user 1.

Figure 5:
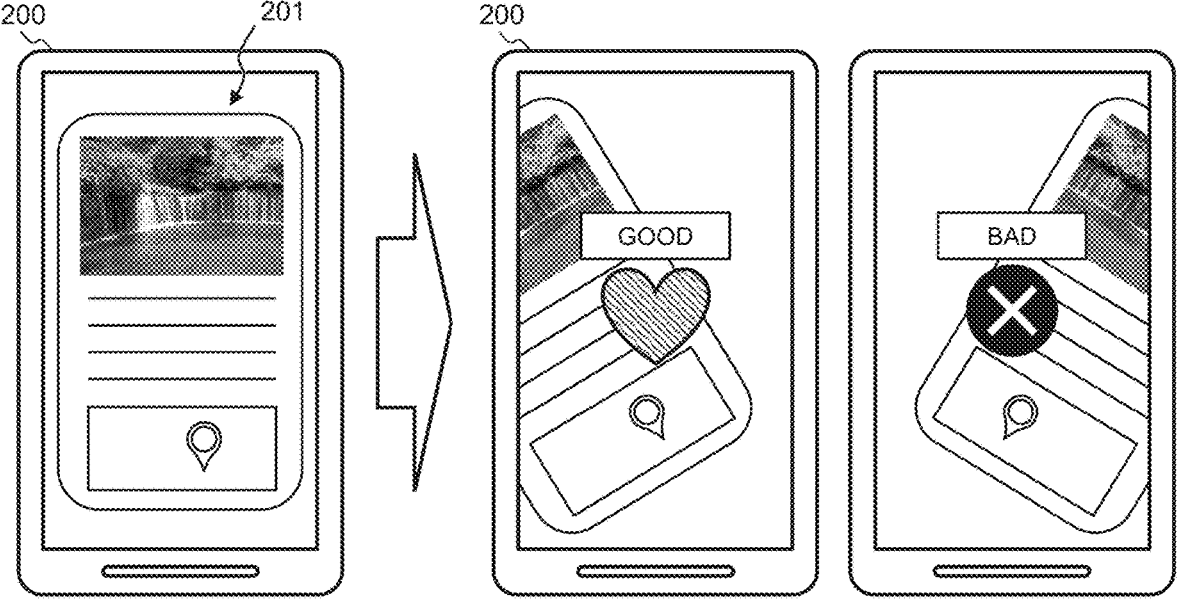
FIG. 5 is a diagram showing an example of an operation of a user device in the first process.

FIG. 5 is a conceptual diagram showing an example of the operation of the user device 200 by the user evaluation acquisition process P110. FIG. 5 shows an example in which the user device 200 displays information 201 of the notification content data on the display. And FIG. 5 shows an example in which the user device 200 receives the evaluation of whether the notification content data is positive (GOOD) or negative (BAD). The user 1 can understand what content the notification content data shows by checking the display.

The format for receiving the evaluation of the user 1 may be suitably determined according to the environment to which the present embodiment is applied. It is desirable that the format for receiving the evaluation of the user 1 is a simple and easy. One example is a format that accepts flick input that maps a leftward flick input to a positive rating, a rightward flick input to a negative rating, and an upward flick input to some other rating (e.g., "save to favorites"). Another example is a format in which multiple buttons, each corresponding to a different rating, are displayed on the display and accept button presses. By applying such a simple and easy format, the user 1 can input the evaluation of the notification content data without stress and can proceed with the learning of the preference model 123.

Refer to FIG. 4 again. The preference model updating process P120 updates the preference model 123 of the user 1 based on the evaluation of the user 1 acquired in the user evaluation acquisition process P110 and the preference information D120 linked with the notification content data.

For example, consider a case where the preference information D120 is managed as shown in FIG. 3A and "Content Data #2" are selected as the notification content data. And consider when the user 1 inputs a positive evaluation for the notification content data. In this case, the preference model updating process P120 determines that the user 1 has shown the positive evaluation to the labels "natural" and "photogenic" linked with "Content Data #2". Then, the preference model updating process P120 updates the preference model 123 of the user 1.

More particularly, for example, if the preference model 123 is configured to represent the degree of preference for each label, the preference model updating process P120 increases the degree of like of the user 1 for the labels "natural" and "photogenic". For example, when the preference model 123 is configured to represent the distribution of the degree of preference, the preference model updating process P120 increases the degree of "like" at the positions of the feature vectors of "natural" and "photo attractiveness". Alternatively, the preference model may be updated by a machine learning model that receives the feature vector of each label as an input.

Figure 6:
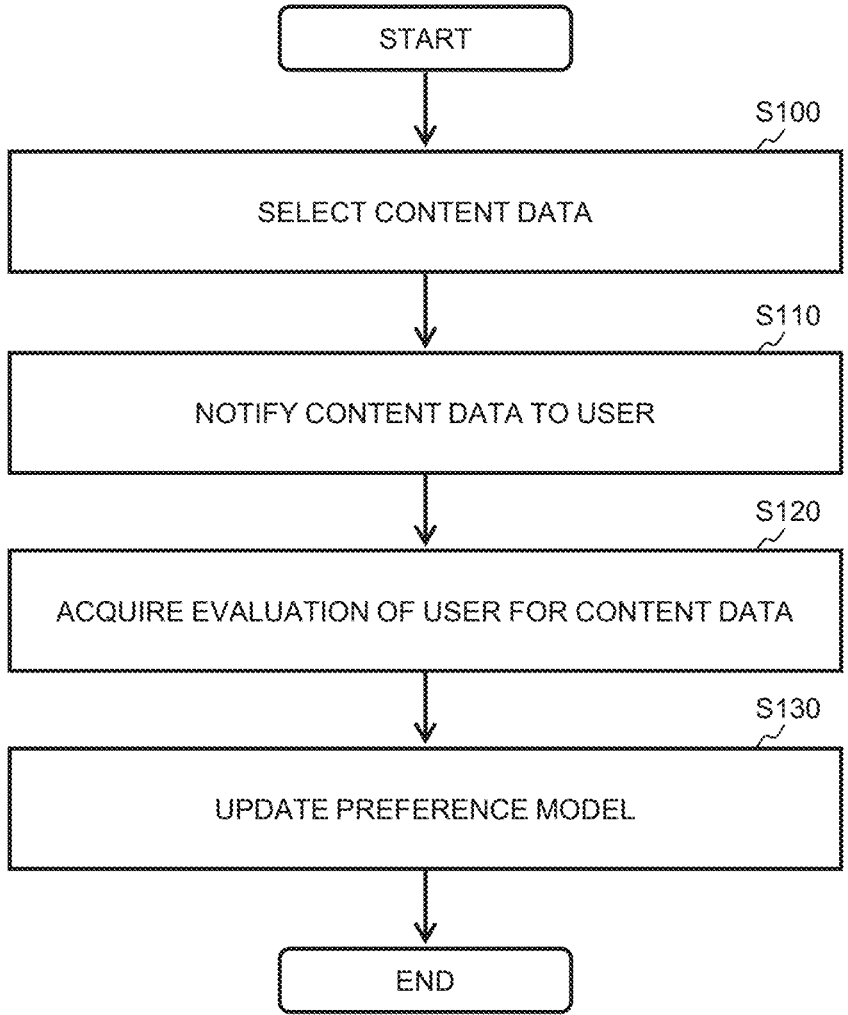
FIG. 6 is a diagram showing an example of a process flow executed by a processing unit in the first process.

The first process is configured as described above. FIG. 6 is a flowchart showing an example of a process flow executed by the processing unit 100 in the first process. The flowchart shown in FIG. 6 starts when a request for execution of the first process is received from the user 1.

In step S100, the processing unit 100 accesses the content database D100 and selects the notification content data D110 from the plurality of pieces of content data. Next, in step S110, the processing unit 100 notifies the notification content data to the user 1.

Next, in step S120, the processing unit 100 acquires the evaluation of the user 1 for the notification content data.

Next, in step S130, the processing unit 100 updates the preference model 123 of the user 1 based on the acquired evaluation of the user 1 and the preference information D120 linked with the notification content data. After step S130, the first process ends.

The processing unit 100 may be configured to repeatedly execute the first process in response to a request from the user 1. In this case, the user 1 inputs the evaluation for the notification content data that are notified one after another from the assistant system 10. Then, the processing unit 100 updates the preference model 123 of the user 1 each time it receives the evaluation of the user 1 from the user device 200. By repeating the first process in this manner, the learning of the preference of the user 1 is advanced.

As described above, according to the first process, the preference of the user 1 is learned based on the evaluation of the user 1 for the notification content data and the preference information D120 linked with the notification content data. The notification content data are selected by the processing unit 100 from the plurality of pieces of content data D110. Thus, the evaluation of the user 1 for various content data D110 can be acquired without being affected by the tendency of the operation of the user 1. Furthermore, the first process is repeatedly executed, and thus it is possible to accurately analyze the preference of the user 1.

Furthermore, according to the first process, the preference of the user 1 can be learned by regarding the evaluation of the user 1 for the notification content data as the evaluation for the preference information D120 linked with the notification content data. Since the preference information D120 represents preference for the service provided by the assistant system 10, the preference of the user 1 for the service provided by the assistant system 10 can be accurately learned.

In the present embodiment, in order to further accurately analyze the preference of the user 1, the following configuration can be applied to the content data selection process P100.

The content data selection process P100 may be configured to select the notification content data by using either a normal selecting procedure or an exceptional selecting procedure. Here, the normal selecting procedure is selecting content data at random from the plurality of pieces of content data D110. And the exceptional selecting procedure is selecting content data from one or more pieces of unmatched content data having a low degree of matching with the preference of the user 1 among the plurality of pieces of content data. Further, the content data selection process P100 may be configured to increase a frequency of using the exceptional selecting procedure as a deflection degree of the preference of the user 1 increases.

The deflection degree can be acquired based on the preference model 123. For example, when the preference model 123 represents the degree of preference for each label, the deflection degree is the bias in the degree of preference among labels. For example, when the preference model 123 represents the distribution of the degree of preference, the deflection degree is the degree of variance of the distribution.

The degree of matching can be indicated by labels having the degree of preference equal to or higher than a predetermined value. In this case, the unmatched content data are, for example, the content data D110 with which no label with the degree of preference equal to or higher than the predetermined value is linked.

By using the exceptional selecting procedure, the content data D110 in a field in which the preference of the user 1 cannot be adequately analyzed can be selected as the notification content data. By learning the preference of the user 1 based on the evaluation of the user 1 for the notification content data in this way, it is possible to suppress biased learning the preference of the user 1. As a result, the preference of the user 1 can be analyzed more accurately.

Furthermore, by increasing the frequency of using the exceptional selecting procedure as the deflection degree of the preference of the user 1 increases, it is possible to suppress a decrease in learning efficiency of the preference of the user 1 due to the exceptional selecting procedure being used when the learning of the preference of the user 1 has not sufficiently progressed.

Figure 7:
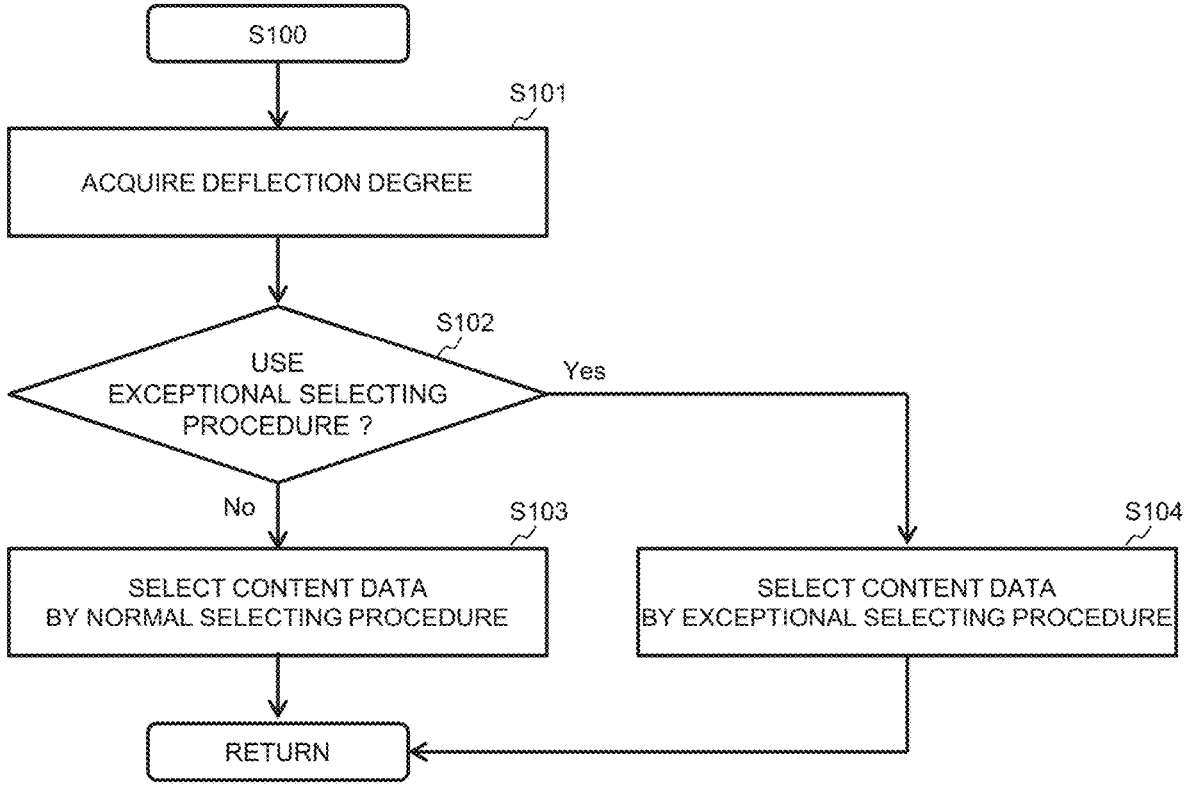
FIG. 7 is a diagram showing an example of a process flow executed by the processing unit in a process of selecting content data to be notified to a user.

FIG. 7 is a flowchart showing an example of a process flow executed by the processing unit 100 in the process of selecting the notification content data (step S100 in FIG. 6) when the above described configuration is applied to the content data selection process S100.

In step S101, the processing unit 100 acquires the deflection degree of the preference of the user 1 based on the preference model 123 of the user 1.

Next, in step S102, the processing unit 100 determines whether or not to use the exceptional selecting procedure. Here, the processing unit 100 may be configured to determine whether or not to use the exceptional selecting procedure with a probability corresponding to the deflection degree acquired in step S101. In particular, the probability of using the exceptional selecting procedure may be given to be higher as the deflection degree increase. Thus, the frequency of using the exceptional selecting procedure can be increased as the deflection degree increases.

When it is determined that the exceptional selecting procedure is not used (step S102; No), the processing unit 100 selects the notification content data by using the normal selecting procedure (step S103). On the other hand, when it is determined that the exceptional selecting procedure is used (step S102; Yes), the processing unit 100 selects the notification content data by using the exceptional selecting procedure (step S104).

2-2. Second Process

Another one of the processes executed by the processing unit 100 is a process (hereinafter, referred to as a second process) for realizing a function of providing the scheduling service to the user 1.

The schedule proposed by the scheduling service is, for example, a schedule of a trip that follows one or more destinations from a departure location to an arrival location. However, the proposed schedule can adopt various formats according to the environment to which the present embodiment is applied and a request from the user 1. For example, the proposed schedule may be a sightseeing schedule for visiting one or more destinations in a specific area, an eating out or shopping schedule including restaurants or shops as destinations that can be visited near the current location, or the like.

The request of the user 1 regarding the scheduling service is, for example, information designating a departure location, a departure date and time, an arrival location, an arrival date and time, an area, a budget, a required time, and the like. Furthermore, the request of the user 1 may be a more abstract request (e.g., a request by voice or text input) such as "I want to go on a trip to **\*\*", "I want to play in the near field", "I want to go to eat delicious food", "I want to go out to kill time", and so on. In this case, the processing unit 100 may be configured to specifically recognize the request of the user 1** by natural language recognition processing or the like.

Figure 8:
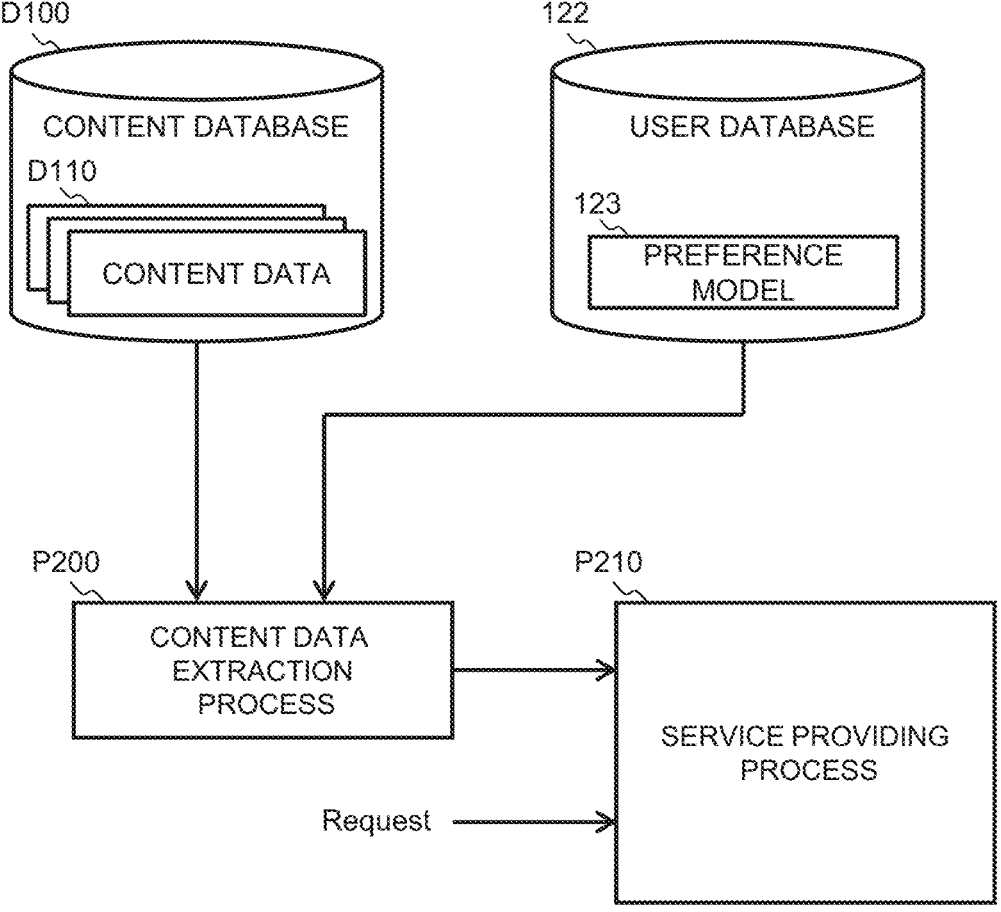
FIG. 8 is a diagram showing an example of a configuration of a second process.

FIG. 8 is a diagram showing an example of a configuration of the second process. The second process includes a content data extraction process P200 and a service providing process P210. These are realized by the processor 110 operating in accordance with the instructions of the computer program 121, for example.

The content data extraction process P200 acquires the preference model 123 of the user 1. And the content data extraction process P200 extracts, based on the acquired preference model 123, one or more pieces of content data (hereinafter, referred to as one or more pieces of match content data) having a high degree of matching with the preference of the user 1 from the plurality of pieces of content data D110. Here, it is desirable that the acquired preference model 123 of the user 1 has been learned to a certain extent by the executing the first process.

The content data extraction process P200 extracts, for example, the content data D110 with which many labels with the degree of preference equal to or higher than a predetermined value as the match content data.

The service providing process P210 provides the scheduling service using the one or more pieces of match content data extracted in the content data extraction process P200. To be more specific, the service providing process P210 creates a schedule by selecting one or more destinations from one or more spots corresponding to the one or more pieces of match content data. Then, the service providing process P210 notifies the created schedule to the user 1. For example, the service providing process P210 transmits the created schedule to the user device 200 and causes the user device 200 to display the created schedule.

The one or more destinations are selected so as to satisfy the request of the user 1. For example, consider a case in which the created schedule is a schedule following one or more destinations from a departure location to an arrival location, and the request of the user 1 designates the departure location, the departure date and time, the arrival location, and the arrival date and time. In this case, the service providing process P210 selects, as the one or more destinations, one or more spots that can be passed through from the departure location to the arrival location and satisfies the departure date and time and the arrival date and time.

Since the one or more pieces of match content are the content data D110 having a high degree of matching with the preference of the user 1 represented by the preference model 123, it is expected that the schedule created in this way matches the preference of the user 1.

Figure 9:
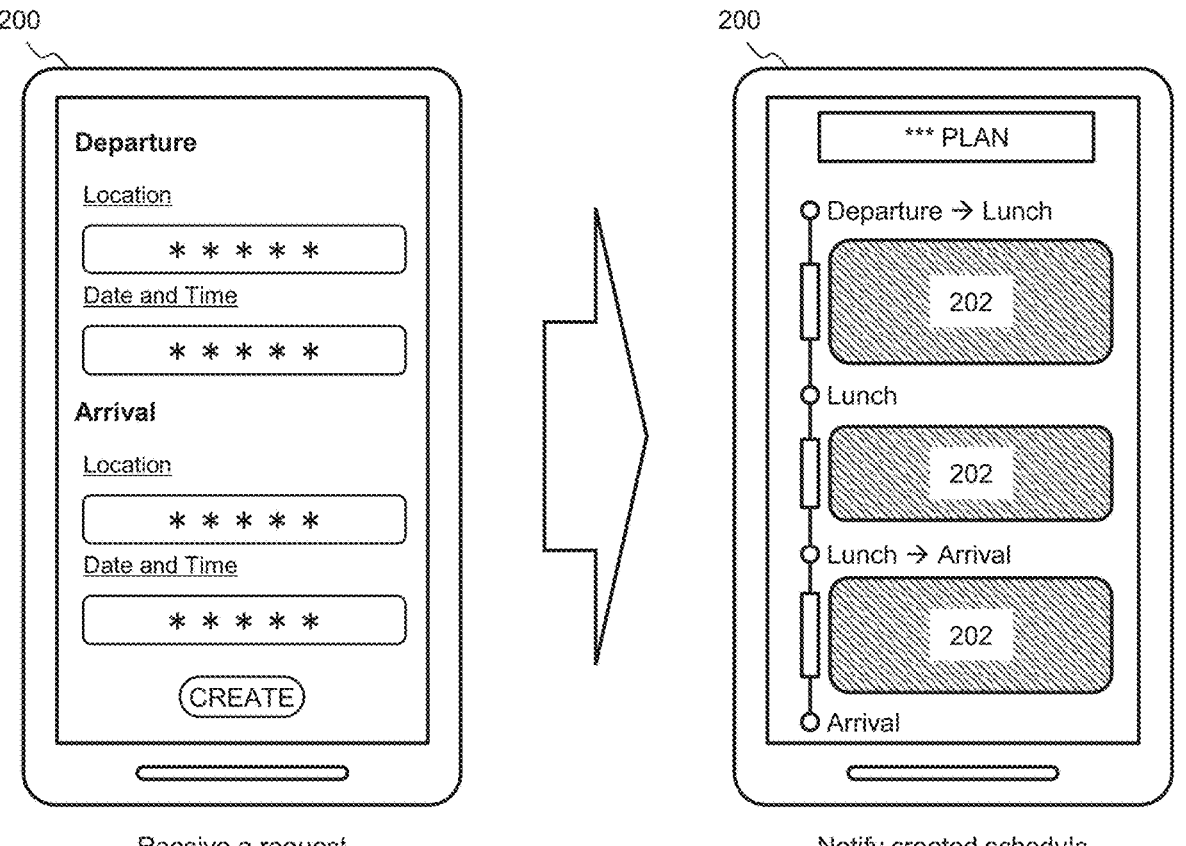
FIG. 9 is a diagram showing an example of an operation of the user device in the second process.

FIG. 9 is a conceptual diagram showing an example of an operation of the user device 200 in the second process. FIG. 9 shows an example in which the user device 200 receives a request from the user 1 and an example in which the user device 200 notifies the created schedule to the user 1. FIG. 9 shows a case where a schedule following one or more destinations from a departure location to an arrival location is proposed.

In the example of receiving the request of the user 1, the user device 200 receives the departure location, the departure date and time, the arrival location, and the arrival date and time as the request. In this example, the user 1 inputs the departure location, the departure date and time, the arrival location, and the arrival date and time. Then the user 1 presses the "create" button to make the request.

In the example of notifying the created schedule to the user 1, the user device 200 displays information of the created schedule. In the example, the created schedule is a schedule following three destinations. The user 1 can understand what the created schedule is by checking the display. In particular, the user device 200 displays spot information 202 for each of the three destinations. The spot information 202 is information such as the name of the spot, the description of the spot, and the required time. The spot information 202 can be generated from the attribute information D112 or the explanatory information D113 of the content data D110. The user 1 can understand what each destination id by checking the spot information 202.

Figure 10:
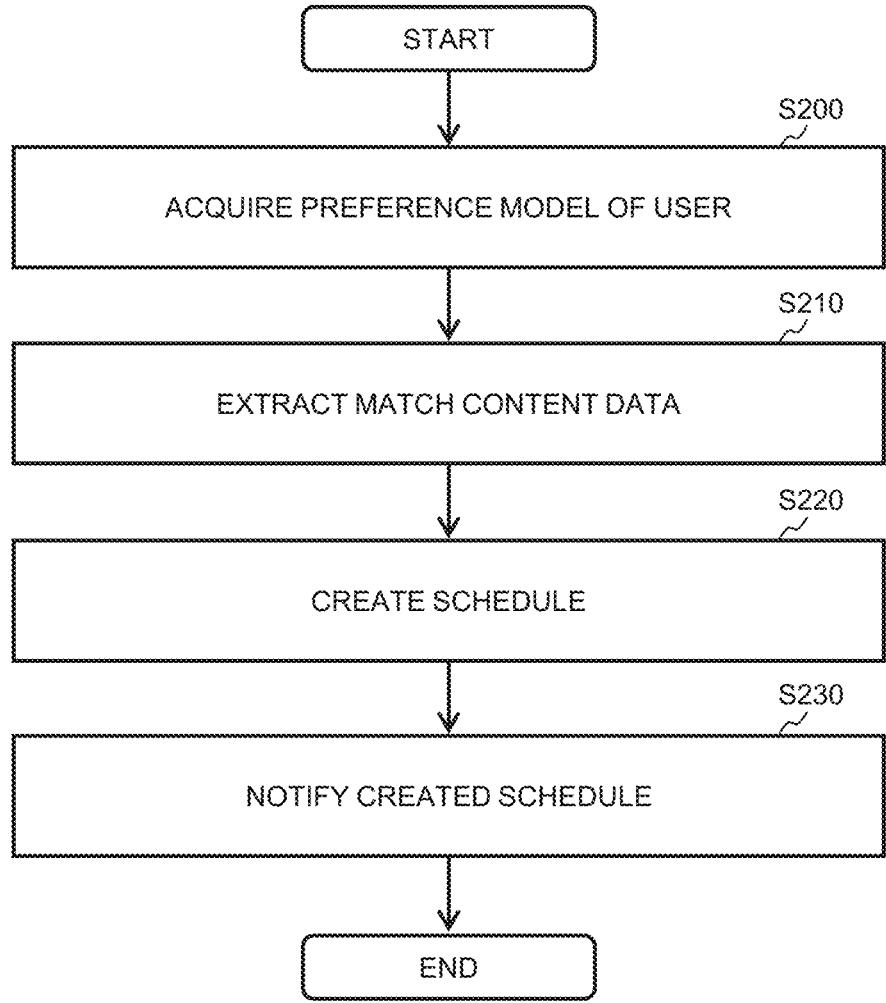
FIG. 10 is a diagram showing an example of a process flow executed by the processing unit in the second process.

The second process is configured as described above. FIG. 10 is a flowchart showing an example of a process flow executed by the processing unit 100 in the second process. The flowchart shown in FIG. 10 starts when a request for execution of the second process is received from the user 1.

In step S200, the processing unit 100 refers to the user database 122. And the processing unit 100 acquires the preference model 123 of the user 1.

Next, in step S210, the processing unit 100 extracts, based on the preference model 123 acquired in step S200, one or more pieces of match content data having a high degree of matching with the preference of the user 1 from the plurality of pieces of content data D110.

Next, in step S220, the processing unit 100 selects, so as to satisfy the request of the user 1, one or more destinations from one or more spots corresponding to the one or more pieces of match content data. And the processing unit 100 creates a schedule including the selected one or more destinations.

Next, in step S230, the processing unit 100 notifies the schedule created in step S220 to the user 1. After step S230, the second process ends.

In the present embodiment, the service providing process P210 may be configured to further receive a change of each destination included in the schedule. The operation of changing each destination may apply any suitable format. For example, when the user device 200 displays the created schedule as shown in FIG. 9, the user 1 changes the destination by performing a flick operation on the spot information 202 of the destination to be changed.

When the user 1 performs the operation to change the destination, the service providing process P210 selects another destination based on the one or more pieces of match content data. And the service providing process P210 notifies the user 1 of a schedule in which the destination for which the change has been received is replaced with the selected another destination.

The service providing process P210 may be configured to provide a navigation service based on the created schedule in response to an approval of the user 1 for the created schedule. For example, the service providing process P210 provides a function of navigating a route that follows the one or more destinations included in the created schedule via the user device 200. A suitable known technique may be applied to the navigation service.

In the second process, it may be considered that the user 1 to which the scheduling service is provided is a user group including a plurality of users. For example, it is a case when proposing a travel schedule following one or more destinations to the user group including a plurality of companions.

So, when the user 1 is the user group including the plurality of users, the content data extraction process P200 may be configured to calculate a group preference model representing preference of the user group. And the content data extraction process P200 may be configured to extract, based on the group preference model, one or more pieces of match content data from the plurality of pieces of content data D110. That is, in this case, the match content data are the content data D110 having a high degree of matching with the preference of the user group.

The group preference model can be calculated based on a priority of each user included in the user group and the preference model 123 of each user included in the user group. For example, the group preference model can be calculated by a weighted average of the preference models of the respective users with the priorities of the respective users as weights.

The priority of each user may be configured to be set by each user. For example, each user inputs the priority by operating the user device 200. At this time, the request of each user may be included in the request of user 1. The processing unit 100 acquires the priority of each user from the user device 200.

By configuring the content data extraction process P200 in this way, it is possible to provide a service that accurately reflects the preferences of the user group.

Figure 11:
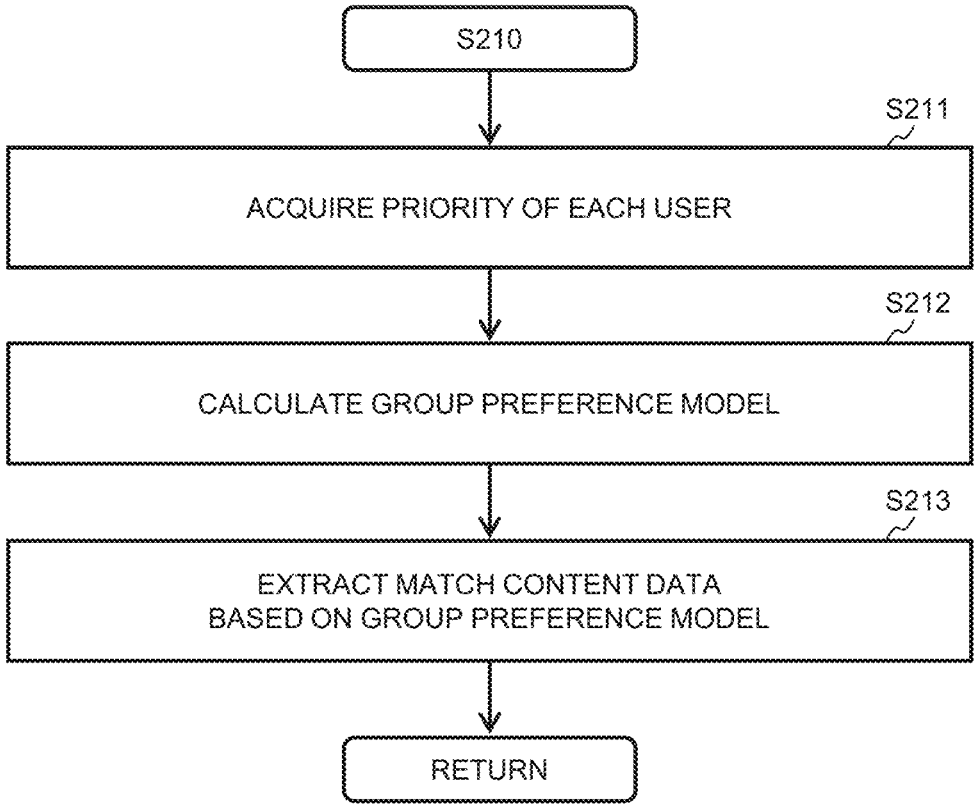
FIG. 11 is a diagram showing an example of a process flow executed by the processing unit in a process of extracting match content data.

FIG. 11 is a flowchart showing an example of a process flow executed by the processing unit 100 in the process of extracting the match content data (step P200 in FIG. 10) when the content extraction process S210 adopts the above configuration.

In step S211, the processing unit 100 acquires the priority of each of the plurality of users included in the user group.

Next, in step S212, the processing unit 100 calculates the group preference model of the user group based on the priority and the preference model 123 of each of the plurality of users acquired in step S211 and in step S200 of FIG. 10.

Next, in step S213, the processing unit 100 extracts, based on the group preference model calculated in step S212, one or more pieces of match content data having a high degree of matching with the preference of the user group from the plurality of pieces of content data D110.

In the second process, the processing unit 100 may be configured to further execute a process of receiving a service evaluation of the user 1 for the provided scheduling service. The processing unit 100 may be configured to update the preference model 123 of the user 1 based on the service evaluation of the user 1 for the scheduling service and the preference information D120 linked with the match content data.

For example, the processing unit 100 acquires the service evaluation (for example, evaluation of positive or negative) of the user 1 for the created schedule. At this time, the processing unit 100 updates the preference model 123 of the user 1 based on the preference information D110 linked with the content data D120 corresponding to the spot included in the created schedule.

By updating the preference model of the user 1 in this way, the service evaluation of the user 1 for the result of the provided scheduling service can be reflected in the preference model 123. In addition, the preference of the user 1 can be analyzed more accurately.

2-3. Third Process

Another one of the processes executed by the processing unit 100 is a process (hereinafter, referred to as a third process) for realizing a function of notifying a proficiency level of the preference model 123 to the user 1.

Figure 12:
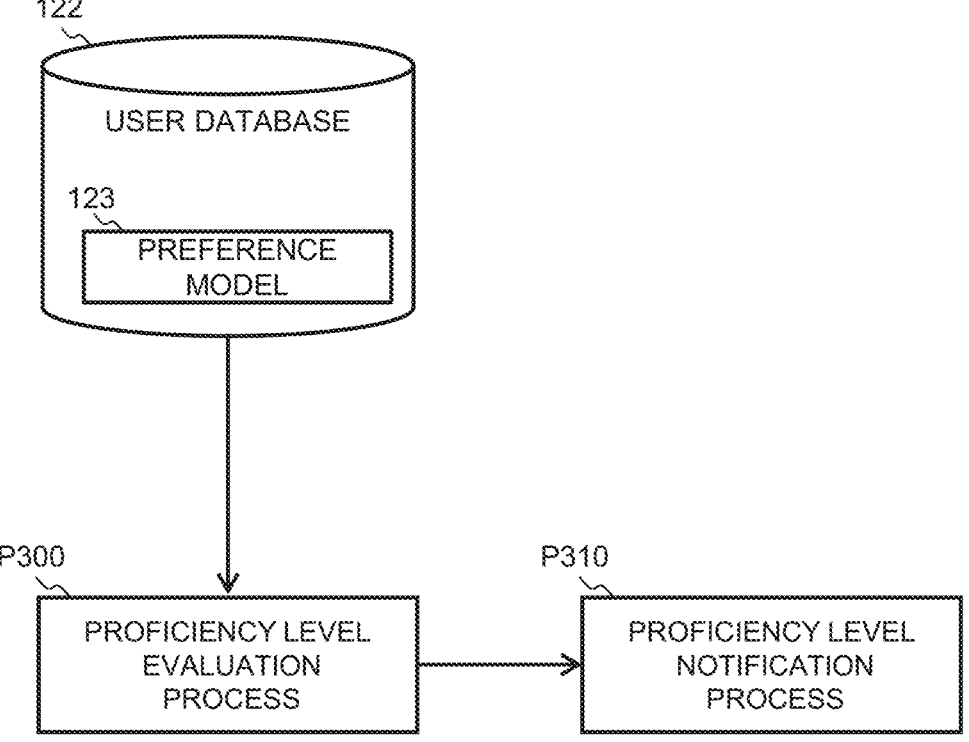
FIG. 12 is a diagram showing an example of a configuration of a third process.

FIG. 12 is a diagram showing an example of a configuration of the third process. The third process includes a proficiency level evaluation process P300 and a proficiency level notification process P310. These are realized by the processor 110 operating in accordance with instructions of the computer program 121, for example.

The proficiency level evaluation process P300 acquires the preference model 123 of the user 1 by referring to the user database 122. And the proficiency level evaluation process P300 evaluates the proficiency level of the acquired preference model 123.

The proficiency level is given, for example, to express the extent to which the preference model 123 can accurately analyze the preference of the user 1 as a numerical value from 0 to 100%. In this case, the closer the proficiency level is to 100%, the more accurately the preference model 123 analyzes the preference of the user 1.

The proficiency level can be evaluated using various kinds of information as an index. One index is the number of times the preference model 123 is updated by the execution of the first process. In this case, it is considered that the proficiency level increases as the number of times of updating of the preference model 123 by the execution of the first process increases. Another one index is an elapsed time from a time point when the preference model 123 is updated last time by the execution of the first process. In this case, it is considered that the proficiency level decreases as the elapsed time increases. Another one index is whether or not the preference model 123 is habitually updated by the execution of the first process (for example, the first process is always executed in a commuting time zone in the morning of a weekday). In this case, it is considered that the more habitual the update of the preference model 123 is, the higher the proficiency level is. Another one index is, when the preference model 123 is generated by the machine learning model, the confidence degree for the preference model 123. In this case, it is considered that the higher the confidence level for the preference model 123, the higher the proficiency level is.

The proficiency level may be evaluated by combining these indexes. The proficiency level may be evaluated from a plurality of viewpoints. For example, the proficiency level may be evaluated for each type of destination (sightseeing, dining, shopping, etc.). The information serving as the index may be managed in the user database 122 for each user.

The proficiency level notification process P310 notifies the user 1 of the proficiency level evaluated in the proficiency level evaluation process P300. For example, the proficiency level notification process P310 transmits the evaluated proficiency level to the user device 200. And the proficiency level notification process P310 causes the user device 200 to display information of the proficiency level.

Figure 13:
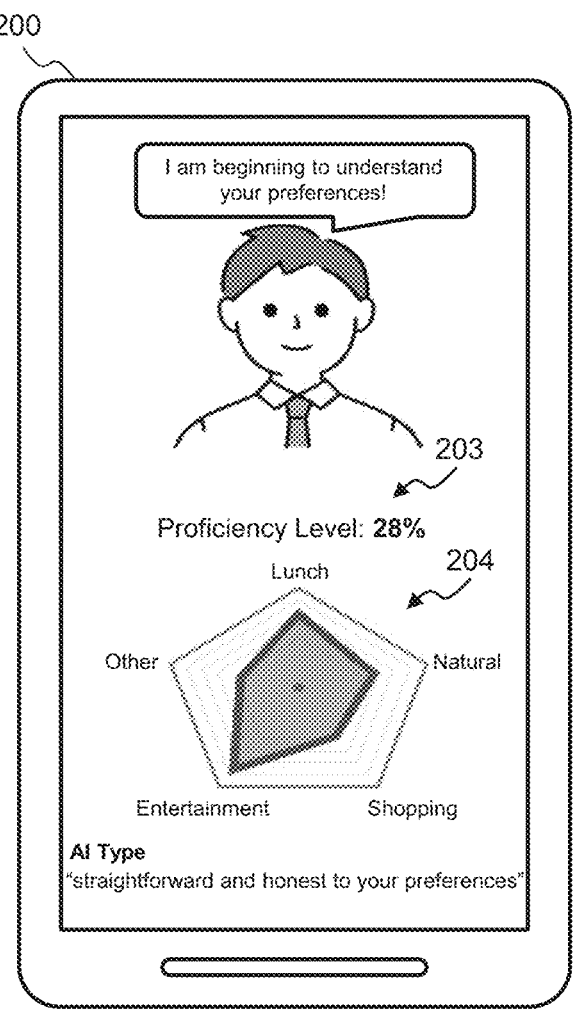
FIG. 13 is a diagram showing an example of an operation of the user device in the third process.

FIG. 13 is a conceptual diagram showing an example of notification by the proficiency level notification process P310. FIG. 13 shows an example in which the user device 200 displays numerical information 203 and chart information 204 of the proficiency level. Here, the chart information 204 visually displays the evaluation of the proficiency level from a plurality of viewpoints. According to the chart information 204, it is understood that the proficiency level related to "Lunch" and "Entertainment" is high, but the proficiency level related to "Shopping" is low.

Figure 14:
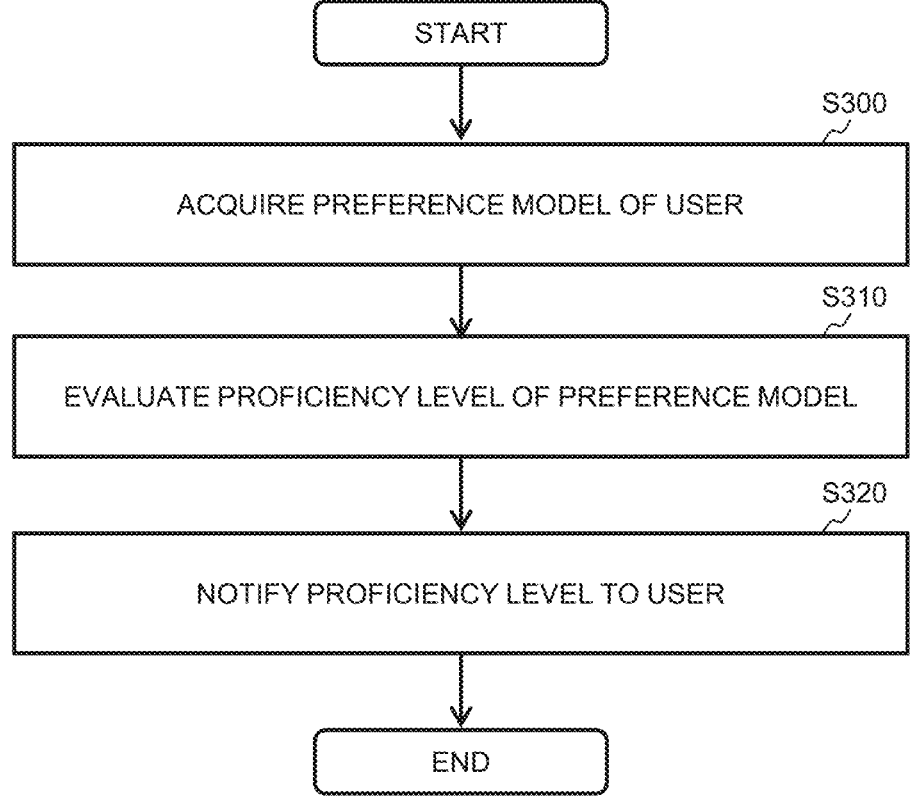
FIG. 14 is a diagram showing an example of a process flow executed by the processing unit in the third process.

The third process is configured as described above. FIG. 14 is a flowchart showing an example of a process flow executed by the processing unit 100 in the third process. The flowchart shown in FIG. 14 starts when a request for execution of the third process is received from the user 1.

In step S300, the processing unit 100 refers to the user database 122 to acquire the preference model 123 of the user 1.

Next, in step S310, the processing unit 100 evaluates the proficiency level of the preference model 123 acquired in step S300.

Next, in step S320, the processing unit 100 notifies the user 1 of the proficiency level evaluated in step S310. After step S320, the third process ends.

The user 1 is notified of the proficiency level by the execution of the third process, and thus the user 1 can understand what extent the assistant system 10 can analyze the preference of the user 1. Furthermore, the user 1 can be prompted to execute the first process and learn the preference model 123 of the user 1. For example, when the user 1 confirms that the proficiency level is low, it is assumed that the user 1 attempts to executes the first process to increase the proficiency level. This makes it possible to further advance the learning of the preference of the user 1. In addition, the preference of the user 1 can be analyzed more accurately.

As described above, various functions of the assistant system 10 are realized by the processes executed by the processing unit 100. Furthermore, by the processing unit 100 executing the processes in this way, an assistant method according to the present embodiment is realized. Furthermore, by configuring the computer program 121 that causes the processing unit 100 to execute the processes in this way, an assistant program according to the present embodiment is realized.

3. Other Embodiments

The assistant system 10 according to the present embodiment can be similarly applied to assistant systems that provide other services that can be realized by the configuration and processing described above.

For example, the other services include a service of proposing a menu for the day's meals. In this case, each of the plurality of pieces of content data D110 managed by the content database D100 is, for example, data regarding dish that is a candidate for the menu. And the preference information D120 is configured by labels indicating, for example, the type of food (fish food, meat food, etc.) and the taste trend (sweet, hot, etc.).

In addition, the present embodiment may be applied to an assistant system that provides various services such as a service of proposing a training menu and a service of proposing a lifestyle.

What is claimed is:

1. An assistant system for providing a service in response to a request from a user, the assistant system comprising:

one or more memories storing a plurality of pieces of content data and a preference model representing preference of the user regarding the service, each of the plurality of pieces of content data linked with preference information regarding the service; and processing circuitry configured to execute a first process and a second process, wherein the first process includes:

selecting notification content data from the plurality of
pieces of content data, the notification content data
being content data to be notified to the user, wherein
the notification content data is selected based on
having a low degree of matching with the preference
of the user;
acquiring an evaluation of the user for the notification
content data; and
updating the preference model based on the evaluation
for the notification content data and the preference
information linked with the notification content data,
wherein the second process includes:
extracting, based on the preference model of the user,
one or more pieces of match content data having a
high degree of matching with the preference of the
user from the plurality of pieces of content data; and
providing the service using the one or more pieces of
match content data, and
wherein the selecting the notification content data in the
first process includes:
acquiring, based on the preference model of the user, a
deflection degree of the preference of the user; and
selecting the notification content data by using either a
normal selecting procedure or an exceptional select-
ing procedure, the normal selecting procedure being
selecting content data at random from the plurality of
pieces of content data, the exceptional selecting
procedure being selecting content data from one or
more pieces of unmatched content data having the
low degree of matching with the preference of the
user among the plurality of pieces of content data,
where a frequency of using the exceptional selecting
procedure increases as the deflection degree
increases.

2. The assistant system according to claim 1, wherein
the processing circuitry is further configured to execute:
evaluating a proficiency level of the preference model;
and
notifying the proficiency level to the user.

3. The assistant system according to claim 1, wherein
the processing circuitry is further configured to execute:
acquiring a service evaluation of the user for the service
provided by executing the second process; and
updating the preference model based on the service evalu-
ation and the preference information linked with the
one or more pieces of match content data.

4. The assistant system according to claim 1, wherein
the user is a user group including a plurality of users, and
the extracting the one or more pieces of match content
data includes:
acquiring a priority of each of the plurality of users;
calculating a group preference model representing pref-
erence of the user group based on the priority and the
preference model of each of the plurality of users;
and
extracting the one or more pieces of match content data
from the plurality of pieces of content data based on
the group preference model.

5. The assistant system according to claim 1, wherein
the service is to propose a schedule including one or more
destinations to the user,
each of the plurality of pieces of content data is data
regarding a spot to be a candidate for the one or more
destinations, and
the providing the service using the one or more pieces of
match content data in the second process includes selecting the one or more destinations from the one or
more spots corresponding to the one or more pieces of
match content data.

6. An assistant method for providing a service in response
to a request from a user by processes executed by a computer
including one or more memories which stores a plurality of
pieces of content data and a preference model representing
preference of the user regarding the service, each of the
plurality of pieces of content data linked with preference
information regarding the service,
wherein the assistant method includes executing a first
process and a second process by the computer,
wherein the first process includes:
selecting notification content data from the plurality of
pieces of content data, the notification content data
being content data to be notified to the user, wherein
the notification content data is selected based on
having a low degree of matching with the preference
of the user;
acquiring an evaluation of the user for the notification
content data; and
updating the preference model based on the evaluation
for the notification content data and the preference
information linked with the notification content data,
wherein the second process includes:
extracting, based on the preference model of the user,
one or more pieces of match content data having a
high degree of matching with the preference of the
user from the plurality of pieces of content data; and
providing the service using the one or more pieces of
match content data, and
wherein the selecting the notification content data in the
first process includes:
acquiring, based on the preference model of the user, a
deflection degree of the preference of the user; and
selecting the notification content data by using either a
normal selecting procedure or an exceptional select-
ing procedure, the normal selecting procedure being
selecting content data at random from the plurality of
pieces of content data, the exceptional selecting
procedure being selecting content data from one or
more pieces of unmatched content data having the
low degree of matching with the preference of the
user among the plurality of pieces of content data,
where a frequency of using the exceptional selecting
procedure increases as the deflection degree
increases.

7. The assistant method according to claim 6, wherein
the service is to propose a schedule including one or more
destinations to the user,
each of the plurality of pieces of content data is data
regarding a spot to be a candidate for the one or more
destinations, and
the providing the service in the second process includes
selecting the one or more destinations from the one or
more spots corresponding to the one or more pieces of
match content data.

8. A non-transitory computer readable recording medium
on which a computer program for causing a computer to
execute processes for providing a service in response to a
request from a user is recorded,
wherein the computer includes one or more memories
storing a plurality of pieces of content data and a
preference model representing preference of the user
regarding the service, each of the plurality of pieces of
content data linked with preference information regard-
ing the service, and wherein the computer program, when executed by the computer, causes the computer to execute a first process and a second process, wherein the first process includes:

selecting notification content data from the plurality of pieces of content data, the notification content data being content data to be notified to the user, wherein the notification content data is selected based on having a low degree of matching with the preference of the user;

acquiring an evaluation of the user for the notification content data; and updating the preference model based on the evaluation for the notification content data and the preference information linked with the notification content data, wherein the second process includes:

extracting, based on the preference model of the user, one or more pieces of match content data having a high degree of matching with the preference of the user from the plurality of pieces of content data; and providing the service using the one or more pieces of match content data, and wherein the selecting the notification content data in the first process includes:

acquiring, based on the preference model of the user, a deflection degree of the preference of the user; and selecting the notification content data by using either a normal selecting procedure or an exceptional selecting procedure, the normal selecting procedure being selecting content data at random from the plurality of pieces of content data, the exceptional selecting procedure being selecting content data from one or more pieces of unmatched content data having the low degree of matching with the preference of the user among the plurality of pieces of content data, where a frequency of using the exceptional selecting procedure increases as the deflection degree increases.

9. The non-transitory computer readable recording medium according to claim 8, wherein the service is to propose a schedule including one or more destinations to the user, each of the plurality of pieces of content data is data regarding a spot to be a candidate for the one or more destinations, and the providing the service in the second process includes selecting the one or more destinations from the one or more spots corresponding to the one or more pieces of match content data.

* * * * *